US012386715B2

(12) United States Patent
Silverstein et al.

(10) Patent No.: US 12,386,715 B2
(45) Date of Patent: Aug. 12, 2025

(54) SELECTIVE FAILOVER BETWEEN A PLURALITY OF DEVICES CONCURRENTLY RUNNING AN APPLICATION

(71) Applicant: International Business Machines Corporation, Armonk, NY (US)

(72) Inventors: Zachary A. Silverstein, Georgetown, TX (US); Melanie Dauber, Oceanside, NY (US); Jacob Ryan Jepperson, St. Paul, MN (US); Vinicius Maidana Alves, São José do Rio Preto (BR); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 18/384,335

(22) Filed: Oct. 26, 2023

(65) Prior Publication Data

US 2025/0138964 A1 May 1, 2025

(51) Int. Cl.
*G06F 11/00* (2006.01)
*G06F 11/07* (2006.01)
*G06F 11/20* (2006.01)

(52) U.S. Cl.
CPC ...... *G06F 11/2023* (2013.01); *G06F 11/0766* (2013.01); *G06F 11/2041* (2013.01); *G06F 11/2048* (2013.01)

(58) Field of Classification Search
CPC ............. G06F 11/2023; G06F 11/2028; G06F 11/2038; G06F 11/2041; H04L 69/40; H04L 65/1066; H04L 65/40
See application file for complete search history.

(56) References Cited

U.S. PATENT DOCUMENTS

| 8,711,202 B2 | 4/2014 | Ranganath et al. |
| 9,432,240 B2 | 8/2016 | Galchev |
| 10,079,714 B2 | 9/2018 | Madabhushi et al. |
| 2013/0027509 A1 | 1/2013 | Ranganath et al. |

(Continued)

OTHER PUBLICATIONS

IBM, "Live Streaming and Video Hosting Solutions," IBM, 2023, 9 pages, retrieved from https://www.ibm.com/watson/media on Jun. 12, 2023.

(Continued)

*Primary Examiner* — Marc Duncan
(74) *Attorney, Agent, or Firm* — Zilka-Kotab, P.C.

(57) ABSTRACT

A computer-implemented method, according to one embodiment, includes identifying a plurality of user devices determined to run a predetermined software version and a predetermined application. A first of the identified user devices is assigned to be a primary user device, and a second of the identified user devices is assigned to be a first backup user device. In response to a determination that the first identified user device launches the predetermined application, the second identified user device is caused to launch the predetermined application. In response to a determination that the first identified user device experiences a predetermined interruption event while using the predetermined application, the second identified user device is assigned to be the primary user device and the first identified user device is assigned to be the first backup user device.

20 Claims, 6 Drawing Sheets

(56) References Cited

U.S. PATENT DOCUMENTS

| | | | |
|---|---|---|---|
| 2014/0171064 A1* | 6/2014 | Das | H04W 84/18 |
| | | | 455/426.1 |
| 2014/0358985 A1* | 12/2014 | Kotecha | H04L 65/1093 |
| | | | 709/202 |
| 2016/0048408 A1 | 2/2016 | Madhu et al. | |
| 2016/0316314 A1* | 10/2016 | Swaminathan | H04W 4/80 |
| 2017/0078617 A1 | 3/2017 | Heda et al. | |
| 2017/0312626 A1* | 11/2017 | Colenbrander | H04L 67/10 |
| 2018/0048522 A1* | 2/2018 | Pan | G06F 11/3006 |
| 2018/0309825 A1 | 10/2018 | Foucher et al. | |
| 2019/0196921 A1 | 6/2019 | Verkaik et al. | |
| 2019/0266054 A1 | 8/2019 | Kumarasamy et al. | |
| 2020/0229697 A1* | 7/2020 | Toth | A61B 5/0205 |
| 2021/0028953 A1 | 1/2021 | Madaan et al. | |

OTHER PUBLICATIONS

Doyle, A., "Webex: Meet and work remotely," IBM Garage Methodology, 2023, 5 pages, retrieved from https://www.ibm.com/garage/method/practices/culture/webex/.

Nagaratnam, N., "3 keys to building a robust hybrid cloud risk strategy," IBM Blog, Oct. 23, 2023, 8 pages, retrieved from https://www.ibm.com/blog/3-keys-to-building-a-robust-hybrid-cloud-risk-strategy/.

Romero, A., "Video streaming vs. video conferencing: Understanding a growing market," IBM Business Partners Blog, May 28, 2020, 4 pages, retrieved from https://web.archive.org/web/20210507232837/https://www.ibm.com/blogs/business-partners/video-streaming-vs-video-conferencing-understanding-a-growing-market/.

IBM, "Connected products at the edge," IBM Blog, May 31, 2023, 8 pages, retrieved from https://www.ibm.com/blog/.

\* cited by examiner

SELECTIVE FAILOVER BETWEEN A PLURALITY OF DEVICES CONCURRENTLY RUNNING AN APPLICATION

BACKGROUND

The present invention relates to user devices, and more specifically, this invention relates to selective failover between a plurality of devices concurrently running an application in order to prepare for and prevent predetermined interruption events from compromising use of the application.

User devices of a network typically include devices such as computers, tablets, cellular phones, etc. Some applications of these user devices are used to communicate with other user devices in collaborative sessions, which may be video-based sessions, audio based sessions, chat sessions, etc. Use of these user device applications is particularly useful to accommodate collaboration and communication between users using user devices, e.g., in different time zones, in hybrid and/or remote work and/or school settings, on different continents, etc.

SUMMARY

A computer-implemented method, according to one embodiment, includes identifying a plurality of user devices determined to run a predetermined software version and a predetermined application. A first of the identified user devices is assigned to be a primary user device, and a second of the identified user devices is assigned to be a first backup user device. In response to a determination that the first identified user device launches the predetermined application, the second identified user device is caused to launch the predetermined application. In response to a determination that the first identified user device experiences a predetermined interruption event while using the predetermined application, the second identified user device is assigned to be the primary user device and the first identified user device is assigned to be the first backup user device.

A computer program product, according to another embodiment, includes a computer readable storage medium having program instructions embodied therewith. The program instructions are readable and/or executable by a controller to cause the controller to perform any combination of features of the foregoing methodology.

A system, according to one embodiment, includes a processor, and logic integrated with the processor, executable by the processor, or integrated with and executable by the processor. The logic is configured to perform any combination of features of the foregoing methodology.

Other aspects and embodiments of the present invention will become apparent from the following detailed description, which, when taken in conjunction with the drawings, illustrate by way of example the principles of the invention.

DETAILED DESCRIPTION

Figure 1:
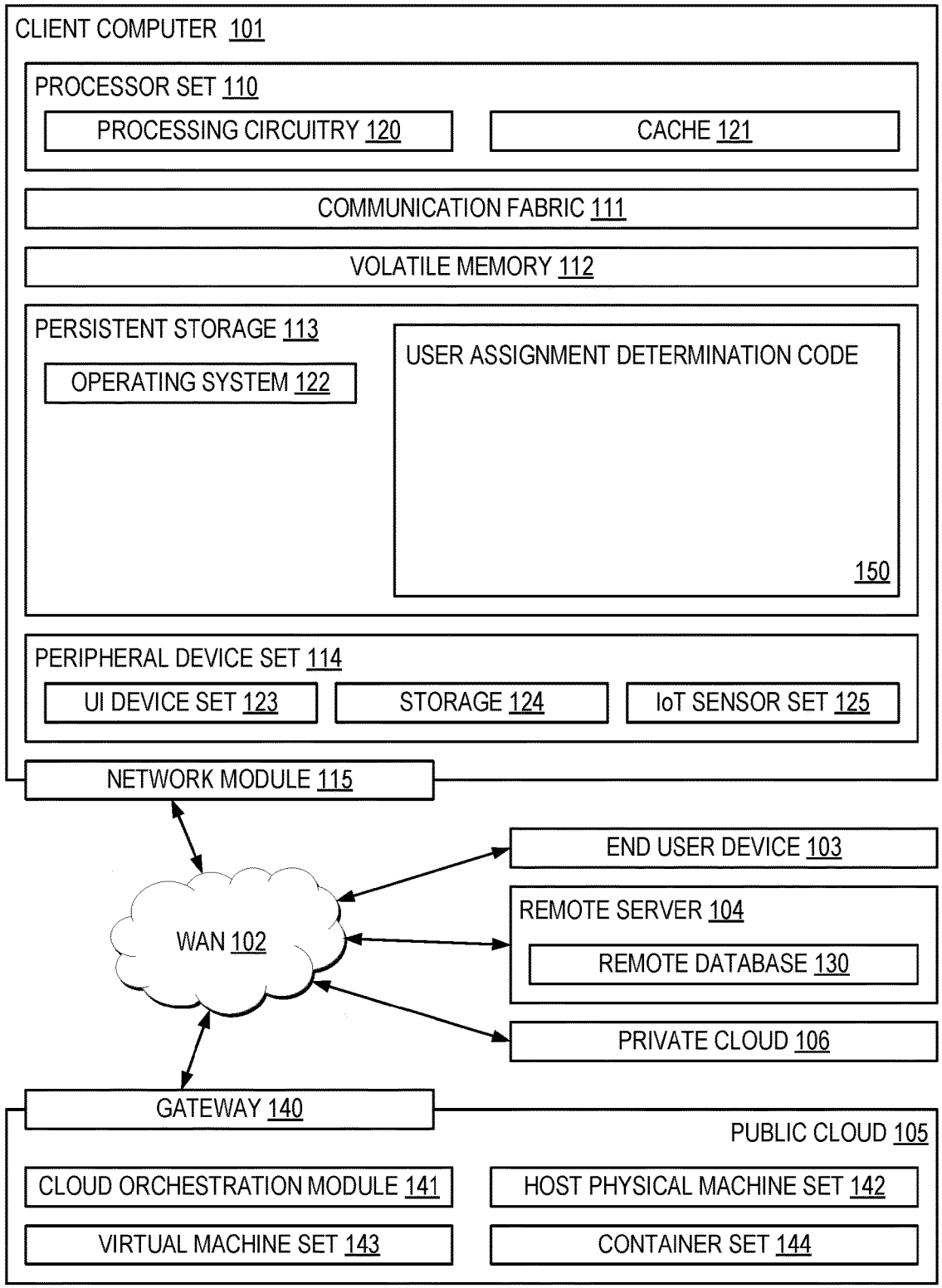
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for selective failover between a plurality of devices concurrently running an application in order to prepare for and prevent predetermined interruption events from compromising use of the application.

In one general embodiment, a computer-implemented method includes identifying a plurality of user devices determined to run a predetermined software version and a predetermined application. A first of the identified user devices is assigned to be a primary user device, and a second of the identified user devices is assigned to be a first backup user device. In response to a determination that the first identified user device launches the predetermined application, the second identified user device is caused to launch the predetermined application. In response to a determination that the first identified user device experiences a predetermined interruption event while using the predetermined application, the second identified user device is assigned to be the primary user device and the first identified user device is assigned to be the first backup user device.

In another general embodiment, a computer program product includes a computer readable storage medium having program instructions embodied therewith. The program instructions are readable and/or executable by a controller to cause the controller to perform any combination of features of the foregoing methodology.

In another general embodiment, a system includes a processor, and logic integrated with the processor, executable by the processor, or integrated with and executable by the processor. The logic is configured to perform any combination of features of the foregoing methodology.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as user device assignment determination code of block 150 for selective failover between a plurality of devices concurrently running an application in order to prepare for and prevent predetermined interruption events from compromising use of the application. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, user devices of a network typically include devices such as computers, tablets, cellular phones, etc. Some applications of these user devices are used to communicate with other user devices in collaborative sessions, which may be video-based sessions, audio based sessions, chat sessions, etc. Use of these user device applications is particularly useful to accommodate collaboration and communication between users using user devices, e.g., in different time zones, in hybrid and/or remote work and/or school settings, on different continents, etc.

When users are using user devices to collaborate on collaborative platforms such as a web-based application, more often than not, during critical times, e.g., the day of a scheduled collaboration session, an issue occurs on a user device that the user is planning to use for the collaboration session and/or is actively using for the collaboration session. For example, the user device may lose audio connectivity, a website that the user device is attempting to navigate to may have a cookie issue, etc. Accordingly, there is a need for techniques that enable seamless swapping between available user devices in response to a determination that an issue occurs on a user device.

In sharp contrast to the deficiencies of the conventional user devices mentioned above, the techniques of embodiments and approaches described herein include causing a failover to occur from a first user device assigned to be a primary user device to a second user device assigned to be a backup user device (and thereby become the primary device which may be also be referred to as a "device of interaction (DOI)") in response to a determination that the first identified user device experiences a predetermined interruption event while using a predetermined application. This failover includes automatically swapping video and/or audio between the devices which would otherwise take a relatively significant amount of time to manually perform. This relatively streamlined failover is enabled by causing the backup user device to be idle during the primary user device usage.

Figure 2:
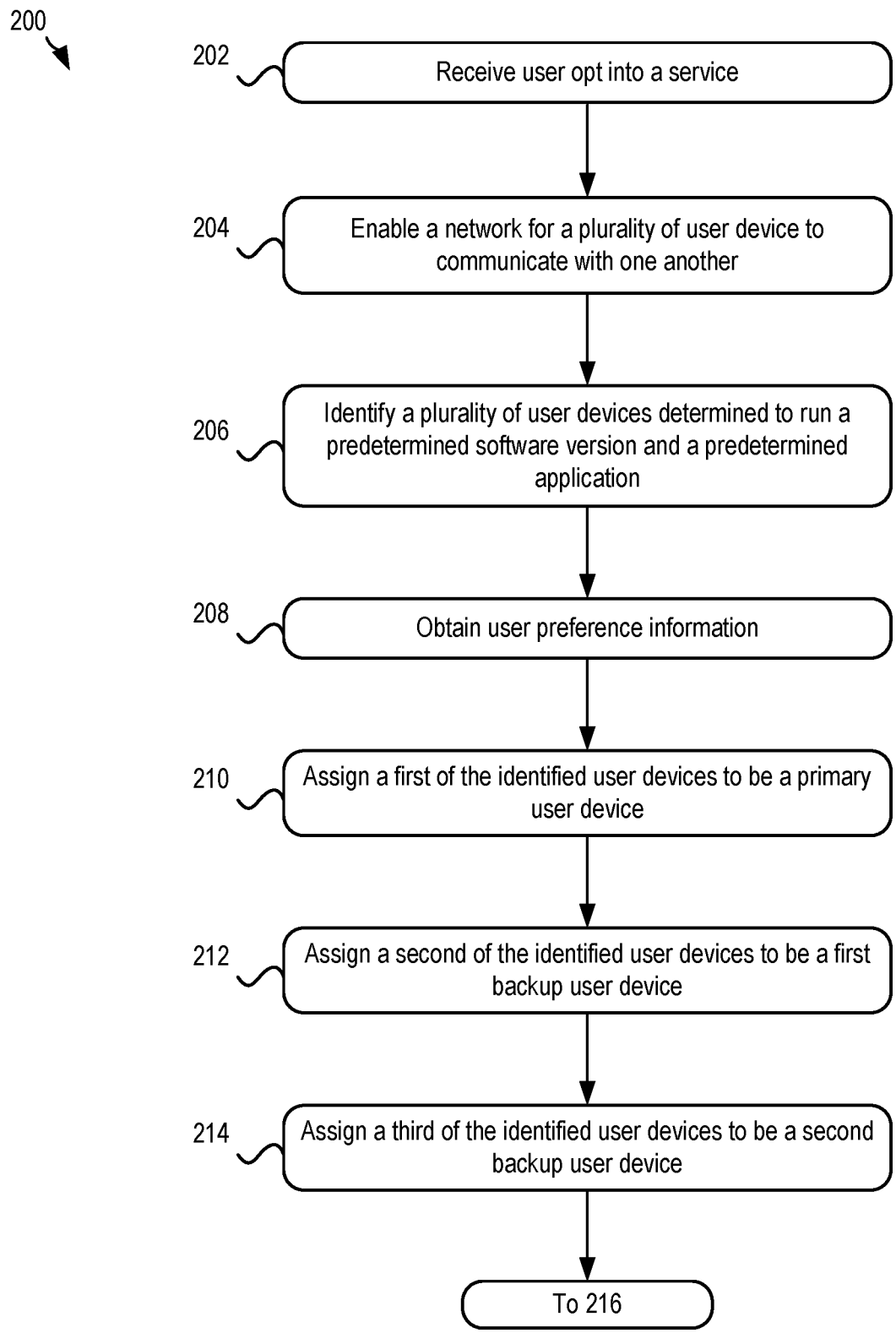
FIG. 2 is a flowchart of a method, in accordance with one embodiment of the present invention.
Figure 2:
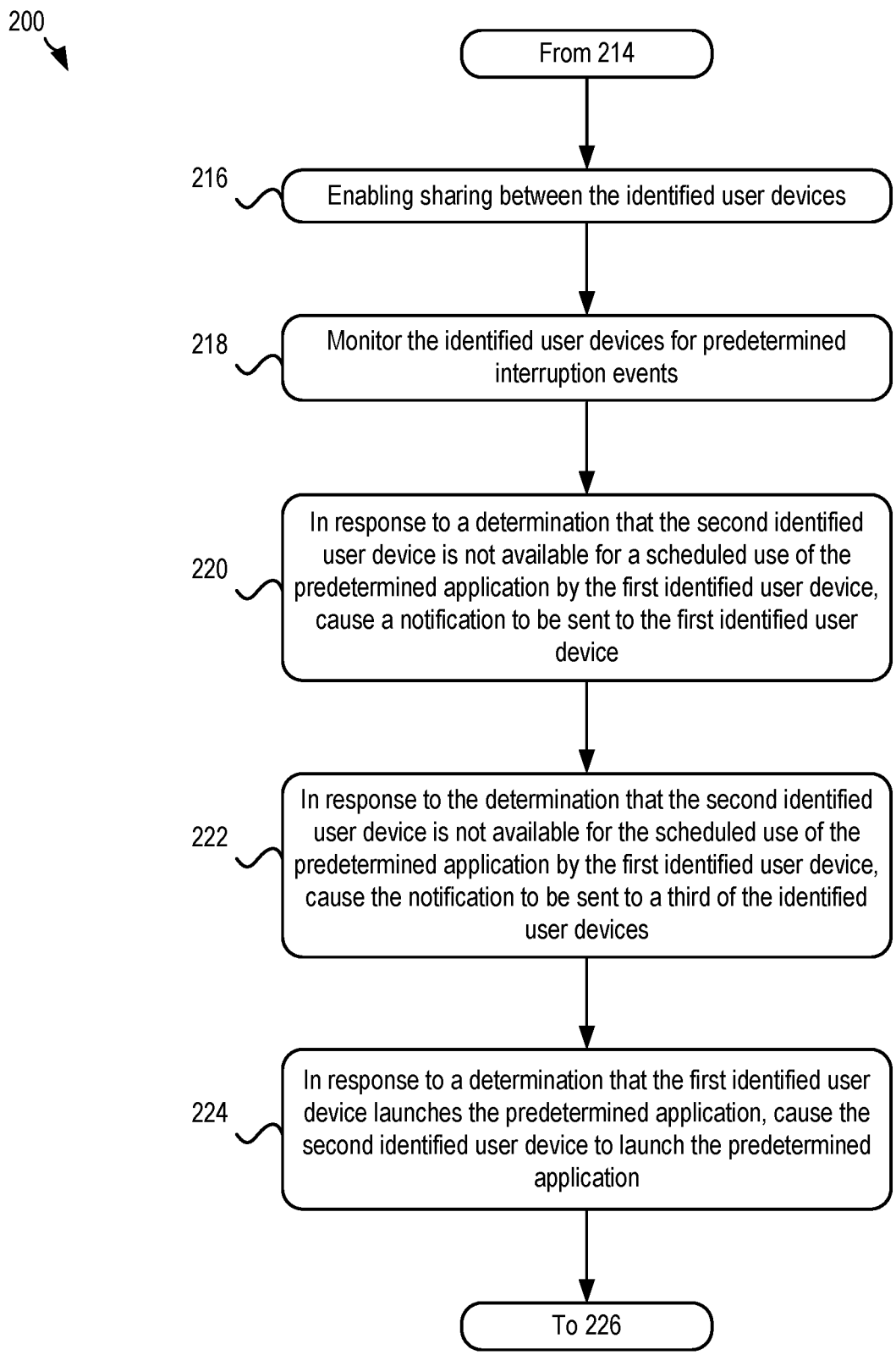
Figure 2:
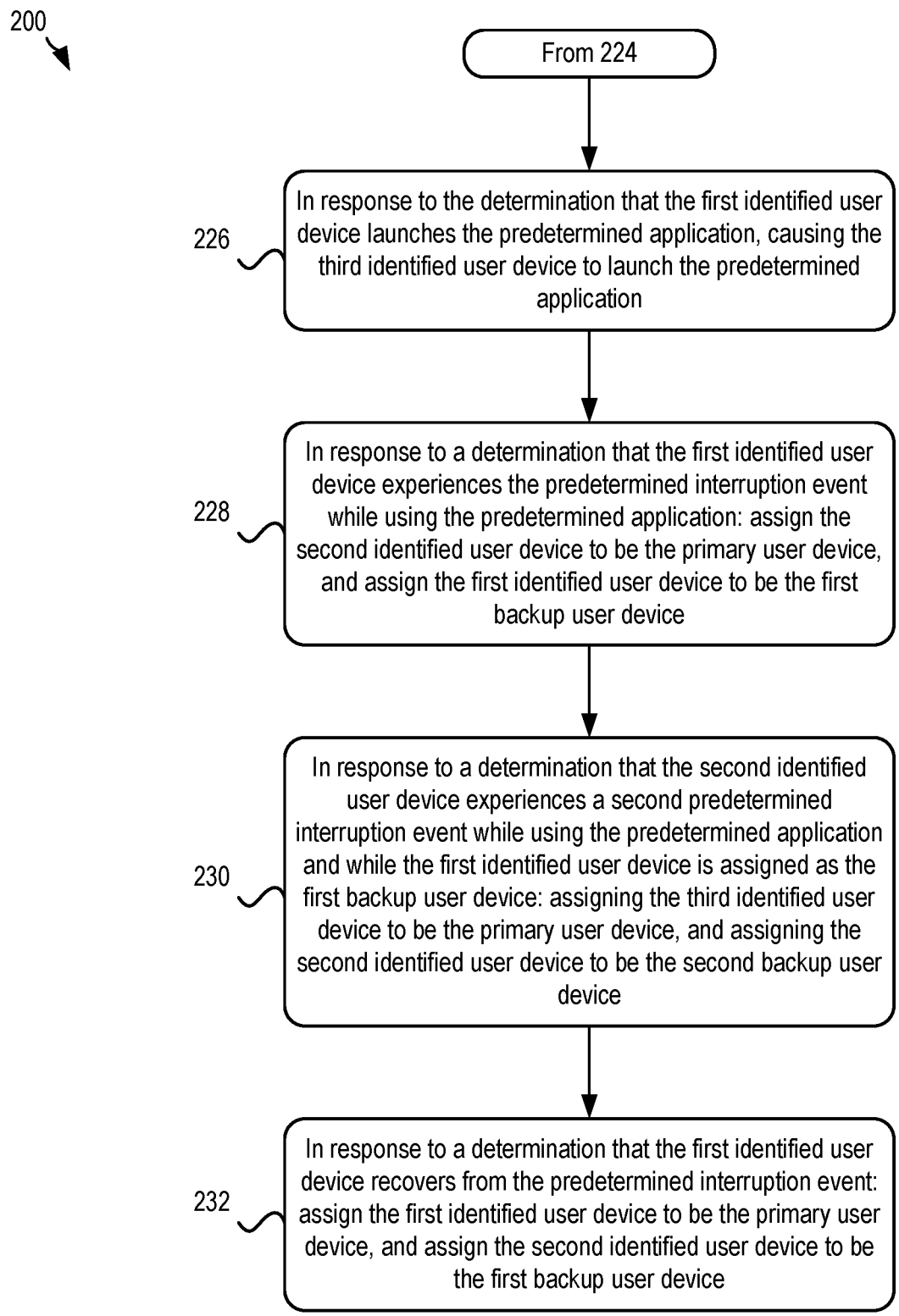

Now referring to FIG. 2, a flowchart of a method 200 is shown according to one embodiment. The method 200 may be performed in accordance with the present invention in any of the environments depicted in FIGS. 1-3, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a network connection controller, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes receiving an indication that a user opts into a service. It may be prefaced that, in some preferred approaches, operations of method 200 may be performed by a controller that is configured to identify a plurality of user devices, communicate with the user devices, and cause the user devices to launch one or more applications to connect with one or more other user devices. Furthermore, depending on the use case, method 200 may be performed in an environment that is, e.g., a cloud-based environment, a local-based environment, etc. In some approaches, the techniques described herein are performed in an environment that includes a module that resides on a cloud based server or a local user device, and monitors, e.g., such as by a controller that is in communication with a plurality of user devices, the success of interactions on a primary user device, and upon detection of issues, swaps to a backup user device.

Privacy of users associated with these user devices is prioritized and protected. Accordingly, in these preferred approaches, method 200 includes presenting users of the user devices, e.g., via an outputting to the user devices, described herein with an option to opt into a service that is deployed and based on operations of method 200. A response may be received that includes an indication that the user opts into the service, and in response thereto, the method optionally proceeds to operation 204. This indication may, in some approaches, include the user accepting the invitation and electing to install a predetermined application and/or module on one or an array of user devices. In some approaches, as soon as the module is installed on the desired user devices, the user devices may be configured to detect and communicate with each other through the module. Furthermore, in some approaches, the user devices may include an array of IoT user devices that are configured to communicate through a variety of manners, e.g., wireless, Bluetooth, etc.

Operation 204 includes enabling, e.g., launching, a network for a plurality of user devices to communicate with one another. In some approaches, the user devices communicate through a centralized or decentralized module, and that module may reside on the cloud, or it may live locally on a predetermined network. In some use cases, the network is configured to only span a predetermined location based on a configured range of the network, e.g., a house, a business suite, a commercial office building, a school, etc. With the network enabled, the user devices communicate and monitor each other through the module. For example, in some approaches, as a result of connecting to the enabled network the user devices are able to recognize the other user devices and, in some approaches, actively monitor activity of the other devices. In some approaches, results of this monitoring may be output to and received by a controller that is configured to perform operations of method 200.

Operation 206 includes identifying a plurality of user devices determined to run and/or be capable of running a predetermined software version and a predetermined application. In some preferred approaches, each of the identified user devices are associated with the same user profile, e.g., owned by same user, registered to the same user account, etc. For context, a user device may be identified as being "capable" of running a software version and/or a predetermined application in response to a determination that the user device, e.g., has downloaded the software version and/or the predetermined application on the user device, has processing resources capable of running the predetermined software version and/or application, has hardware capable of running the predetermined software version and/or application, etc.

User preference information may be obtained, e.g., see operation 208. For context, the preference information, in some approaches, details which of the identified user devices that a user, that is associated with and/or that is the owner of, would prefer to be assigned to be a primary user device and/or which of the user devices the user would prefer to be assigned to be backup user devices. In some preferred approaches, the user device that is assigned to be the primary user device is the user device that will thereafter be used to perform collaborative tasks, e.g., a video conference, using the predetermined application. In contrast, the one or more of the other identified user devices are assigned to be backup user devices which run the predetermined application passively and in parallel with the first identified user device, and are thereby available as failure over user device(s) in the event that the user device assigned to be the primary user device experiences a predetermined interruption event. In some other approaches, the assignments may be determined based on an evaluation of historical usage. For example, in some approaches, an identified user device determined to historically be used relatively most may be assigned to be the primary user device, an identified user device determined to historically be used relatively second most may be assigned to be the first backup user device, an identified user device determined to historically be used relatively third most may be assigned to be the second backup user device, etc.

In some approaches, the preference information is obtained as user input that is received from one of the identified user devices. For example, a query may be output to at least one of the identified user devices to enable selection of the user devices, e.g., which device will be the primary user device, which device will be the first backup user device, which device will be the second backup user device, etc. In another approach, predictive analytics that are based on usage metrics may be used for techniques that would become apparent to one of ordinary skill in the art after reading the descriptions herein to determine the assignments of the user devices.

Operation 210 includes assigning a first of the identified user devices to be a primary user device. At least a second of the identified user devices is assigned to be a backup user device. For example, operation 212 includes assigning a second of the identified user devices to be a first backup user device. Furthermore, operation 214 includes assigning a third of the identified user devices to be a second backup user device. In some preferred approaches, the remainder of the identified user devices that are not assigned to be the primary user device are assigned to be backup user devices. As indicated above, these assignments are, in some preferred approaches, based on the obtained user preference information.

Method 200 optionally includes enabling sharing between the identified user devices, e.g., see operation 216. In some approaches, in order to enable this sharing, instructions may be output to the identified user devices to share user device information with the other user devices. This information may include, e.g., connectivity information, audio receipt information, audio output information, video receipt information, video output information, etc. In some other approaches, this user device information is received for the user devices and optionally stored. This user device information may, in some approaches, be used to adjust the assignments, as will be described in greater detail elsewhere herein, e.g., see operation 220, operation 222, etc.

In some approaches, method 200 includes monitoring the identified user devices for predetermined interruption events, e.g., see operation 218. In some approaches, the user device information may be used to determine whether one or more predetermined interruption events have occurred on one or more of the user devices. The predetermined interruption event may, in some approaches, include, e.g., a loss of wireless network connection, a power outage, a restart of the user device, an audio failure (audio input failure and/or audio output failure), a software failure, an update of the predetermined application, an update of the predetermined software version etc. In some other approaches, the predetermined interruption event may additionally and/or alternatively be determined based on, e.g., hardware behavior, software behavior, host messages, at the application or user dependent level such as natural language process (NLP) of messages received from other participant user devices (off-site user devices), etc.

Prior to use of the predetermined application, each of the user devices may wait in a predetermined mode, e.g., a standby mode. However, in some preferred approaches, in response to a determination that any of the one or more user devices are not available for a respectively assigned responsibility, e.g., to be a primary user device, to be a backup device, to enter into a collaboration session with an off-site user device, etc., a notification is preferably output to notify a user associated with the identified user devices, e.g., an owner of the user devices, a user of the user devices, etc., that the one or more user devices are not available and/or ready to be used. Unavailability may be caused by, e.g., loss of a power connection and/or charge, a predetermined interruption event, etc. In some approaches, a check is performed for determining whether each of the user devices are available. The check may be performed, e.g., in response to a determination that use of the predetermined application is scheduled, in response to a determination that use of the predetermined application is to occur within a predetermined amount of time, etc. In response to a determination that the second identified user device is not available for a scheduled use of the predetermined application by the first identified user device, a notification is caused to be sent to the first identified user device, e.g., see operation 220. The notification preferably indicates that the second identified user device is not available. The notification may additionally and/or alternatively be sent to one or more other user devices, e.g., spammed as a push notification to all of the user devices, output to a user device that the user is determined to be currently using, etc. Furthermore, in response to the determination that the second identified user device is not available for the scheduled use of the predetermined application by the first identified user device, the notification is caused to be sent to a third of the identified user devices, e.g., see operation 222. In other words, in some approaches, in response to a determination that at least one of the identified user devices is not available, an indication of the unavailability may be spammed to all of the other identified user devices that are determined to be available. The notification may, in some approaches, include metadata that details information about the unavailability, e.g., a root cause analysis performed, timestamp information, metadata that details user device information before the user device lost availability, etc. In some approaches, determination of available user devices may incorporate historical data, e.g., records that indicate which user devices have been historically used by a user. For example, in some approaches, a determination may be made that a user device that is normally used by a user is not included in the identified user devices. In some use cases, this unavailability may result from the user turning off a user device after installing new software on the user device and forgetting to turn the device back on prior to a collaboration call. Based on this determined past usage of the user device, a push notification may be sent to at least one of the identified user devices with an indication to turn on the user device.

One or more of the identified user devices may, in some approaches, be determined to be available in response to a determination that each of the identified user devices are within a predetermined proximity of one another, e.g., within a predetermined number of feet, within the same network range, at the same address, etc. Techniques for determining device proximity that would become apparent to one of ordinary skill in the art after reading the descriptions herein may be used. In response to a determination that at least one of the identified user devices is no longer within a predetermined proximity of the other identified user devices, a notification may be output to the other identified user devices. Furthermore, in some approaches, a current assignment of the at least one of the identified user devices that is no longer within the predetermined proximity of the other identified user devices may be reassigned to another of the user devices determined to currently be within the predetermined proximity of the identified user device currently assigned to be the primary user device.

The identified user devices assigned to be backup user devices may, in some approaches, mirror application activity of the identified user device assigned to be the primary user device. For example, in one of such approaches, in response to a determination that the first identified user device launches the predetermined application, the second identified user device is caused to launch the predetermined application, e.g., see operation 224. Causing the second identified user device to launch the predetermined application may, in some approaches, include instructing the second identified user device to launch the predetermined application and reside in a passive and in a parallel state with the first identified user device. This "passive state" may, in some approaches, include the second identified user device joining a collaboration call, e.g., a video conference, and remaining in a muted state during the collaboration call. In the passive state, the identified user device, may additionally and/or alternatively be caused to run a mirrored copy of software and/or displayed content that the first identified user device is running and/or at least some actions being performed by the first identified user device. For example, in some approaches, the backup user devices may be caused, e.g., instructed, to have the same application or screen content open as the primary user device. In another approach, the second identified user device being added as an invited party to the collaboration call, e.g., and reside in a virtual waiting room of user devices approved to join the collaboration call, may place the second identified user device in the passive state. One or more of the other identified user devices may additionally be caused to mirror the first identified user device's application behavior. For example, in response to the determination that the first identified user device launches the predetermined application, the third identified user device may be caused to launch the predetermined application, passively and in parallel with the first identified user device, e.g., see operation 226. In some approaches, the parallel passive state may, in some approaches, be relatively slightly more unique than a state that the primary user device resides in, e.g., such as having connection a video conferencing platform but having audio and a microphone muted. In some approaches, the user devices assigned to be backup user devices are caused, e.g., instructed, to listen to the user device assigned to be the primary user device and mirror an application workload of the user device assigned to be the primary user device. The user devices assigned to be backup user devices may additionally and/or alternatively be caused, e.g., instructed, to monitor for predetermined errors associated with the predetermined interruption events and share the errors locally and/or with the server that is reviewed by a device that performs the operations of method 200.

A collaboration session may, in some approaches, be launched by the first identified user device using the predetermined application. In some approaches, in response to the first identified user device being assigned to be the primary user device, data associated with the first identified user device's use of the predetermined application may be output to an off-site user device. In some approaches, the data associated with the first identified user device's use of the predetermined application may be output via, e.g., HTTP/webhooks, local communication (such as Wi-Fi, Bluetooth, ZigBee, etc.), etc. This data associated with the first identified user device's use of the predetermined application may include, e.g., voice, text, video, connection information for establishing a handshake, webhook information, handshake information, etc. For context, the off-site user device may be defined as a user device that is not one of the identified user devices and that is not within a predetermined proximity to any of the identified user devices and that is using the predetermined application to collaborate with the first identified user device. For example, an off-site user device may be a user device that is associated with and/or owned by a second user. Meanwhile, in some preferred approaches, predetermined data associated with the second identified user device's use of the predetermined application is not output to the off-site user device while the first identified user device is assigned to be the primary user device and the second identified user device is assigned to be the first backup user device. For example, video and audio feed data of the second identified user device's use of the predetermined application and video and audio feed data of the third identified user device's use of the predetermined application may not be output to the off-site user device. However, the video and audio feed data of one or more of these user devices may eventually be an off-site user device in the event that one or more of these user devices is reassigned to be the primary user device.

The assignments described herein are preferably performed automatically, e.g., do not involve user input on the device which would otherwise introduce latency and error into connection operations. Furthermore, reassignments may be automatically performed in response to a predetermined event occurring. For example, in response to a determination that the first identified user device experiences a predetermined interruption event while using the predetermined application, the second identified user device is assigned, e.g., "reassigned from being the first backup user device", to be the primary user device, and the first identified user device is assigned, e.g., "reassigned from being the primary user device", to be the first backup user device, e.g., see operation 228. This way, in response to the determination that first identified user device experiences the predetermined interruption event, the second identified user device acts as a failover for the first identified user device. In some use cases, the second identified user device may experience a predetermined interruption event while standing in assigned as the primary user device. In response to a determination that the second identified user device experiences the predetermined interruption event while standing in assigned as the primary user device, a failover may be performed to yet another backup user device (provided that a determination that the first identified user device has not yet recovered from the predetermined interruption event is made). For example, in response to a determination that the second identified user device experiences a second predetermined interruption event while using the predetermined application and while the first identified user device is assigned as the first backup user device, method 200 includes assigning the third identified user device to be the primary user device, and assigning the second identified user device to be the second backup user device, e.g., see operation 230.

Although various approaches above detail failovers being performed in response to a determination that a user device experiences an interruption event, in some other approaches, method 200 may include causing a user device that experiences an interruption event to attempt one or more predetermined auto-remediation steps, e.g., changing an input, cycling through potential audio outputs, changing a connection address, etc., before performing any reassignments. In response to a determination that the predetermined auto-remediation steps do not resolve the interruption event, in some approaches the reassignments may be performed to cause the failovers described above.

Because assignments described herein are preferably performed automatically, delay and latency, that would otherwise be incurred in a collaboration session between user devices as a result of the predetermined interruption event occurring, are mitigated. In some use cases, a negligible delay, e.g., less than one second, of audio or video feed may be experienced by a user of an off-site user device during a transition from a primary user device to a backup user device. Accordingly, in some approaches, method 200 may optionally include outputting, to the off-site user device, a notification of a delay, e.g., "please excuse a slight adjustment delay", in response to the determination that the first identified user device experiences the predetermined interruption event. However, it should be noted that because this transition from the primary user device to the backup user device is automated, the delay may, in some approaches, not even be noticeable, and therefore the notification may optionally not be sent out.

Monitoring may be performed for determining whether a user device that has experienced a predetermined interruption event has recovered from the predetermined interruption event. For context, a user device may be determined to have "recovered" from a predetermined interruption event in response to a determination that the user device returns to a predetermined functioning state, e.g., errors determined to have been impacting displayed content stop, connectivity of the user device, a test sample of audio being successfully received, etc. In response to a determination that the first identified user device recovers from the predetermined interruption event, the first identified user device may be assigned to be the primary user device, and the second identified user device may be assigned to be the first backup user device, e.g., see operation 232. A notification may be output to one or more of the identified user devices that indicates that at least one of the user devices has recovered from the interruption event and/or that a reassignment is occurring. It may be noted that these assignments may technically be considered "reassignments" as the assignments may revert the assignments to match preferences indicated in the received preference information. In some approaches, these assignments may include at least temporarily stopping outputting of data associated with the second identified user device's use of the predetermined application and resuming outputting of data associated with the first identified user device's use of the predetermined application.

In some approaches, new user devices may be added to a plurality of identified user devices, e.g., in response to a determination that a user associated with the identified user devices has purchased a new user device. This ensures that all the identified user devices have the predetermined software version and/or the predetermined application. Proactive notifications and when authorized, automatic downloads and updates of applications may be caused to be performed on the user devices, in some approaches. For example, where a user has a laptop and phone for work, in response to a determination that the user has recently purchased a tablet, a notification is output to at least one of the laptop and phone to remind the user of the software and/or application(s) to download to be eligible to be used for the techniques described herein.

In some approaches, the operations of method 200 may be performed by an AI model that is trained using a predetermined training set of data. For example, in some approaches, various of the operations noted above may be deployed in a trained state of a trained AI model. Training of the AI model, in some approaches, may be performed by applying a predetermined training data set to learn how to make assignments to user devices, monitor the user device, and in response to a determination that a predetermined interruption event has occurred, make reassignments. Initial training may include reward feedback that may, in some approaches, be implemented using a subject matter expert (SME) that generally understands interruption events. However, to prevent costs associated with relying on manual actions of a SME, in another approach, reward feedback may be implemented using techniques for training a BERT model, as would become apparent to one skilled in the art after reading the present disclosure. Once a determination is made that the AI model achieves a redeemed threshold of accuracy of performing the operations described herein during this training, a decision that the model is trained and ready to deploy for performing techniques and/or operations of method 200 may be made. In some further approaches, the AI model may be a neuromyotonic AI model that may improve performance of computer devices in an infrastructure associated with the user devices described herein, because the neuromyotonic AI model may not need an SME and/or iteratively applied training with reward feedback in order to accurately perform operations described herein. Instead, the neuromyotonic AI model is configured to itself make determinations described in operations herein. Weight values may, in some approaches, be used by the AI reasoning model to collect and analyze information and/or feedback potentially received from user devices. Such an AI model ensures that only negligible amounts of interruption (if any) is experienced by user devices of collaboration events, where the scale of such analysis and determinations would not otherwise be feasible for a human to perform. This is because humans are not able to efficiently cause the assignments and reassignments described herein to be automatically and dynamically performed, and would otherwise incorporate processing delays and errors in the process of attempting to respond to interruption events. Accordingly, management of operations described herein is not able to be achieved by human manual actions.

In a use case example of the techniques described herein, a first user may be assumed to work in the sales field and spends a majority of their day on the phone talking to potential customers, e.g., trying to sell software solutions. The first user depends on a conferencing software to deliver relatively fluid and smooth experiences for clients, customers, and ultimately for the first user. Upon launching software configured to perform operations of method 200, a plurality of user devices associated with the first user may be determined to be ready for usage at the first user's home office, e.g., a laptop, a tablet, and a phone. An assumption may be made that the first user has previously used all of these devices before for web conferencing at various times. In response to a determination that the first user has opted-in to a software application, a predetermined process may begin. Upon initiating a video conference on the laptop, the tablet and the phone may also attend the video conference as muted participants. An assumption may be made that after about twenty minutes on the web conference, connection from the laptop is lost while the first user is talking about page number eight of a presentation that the first user uploaded into a cloud hosting site. The tablet is automatically assigned to be the primary user device in place of the laptop, thereby allowing the first user to seamlessly continue presenting without missing any key points on page eight of the presentation.

Software for performing the methodology of FIG. 2 may be deployed to a computer that will perform the method via any known technique. An exemplary process for such deployment is presented immediately below.

Figure 3:
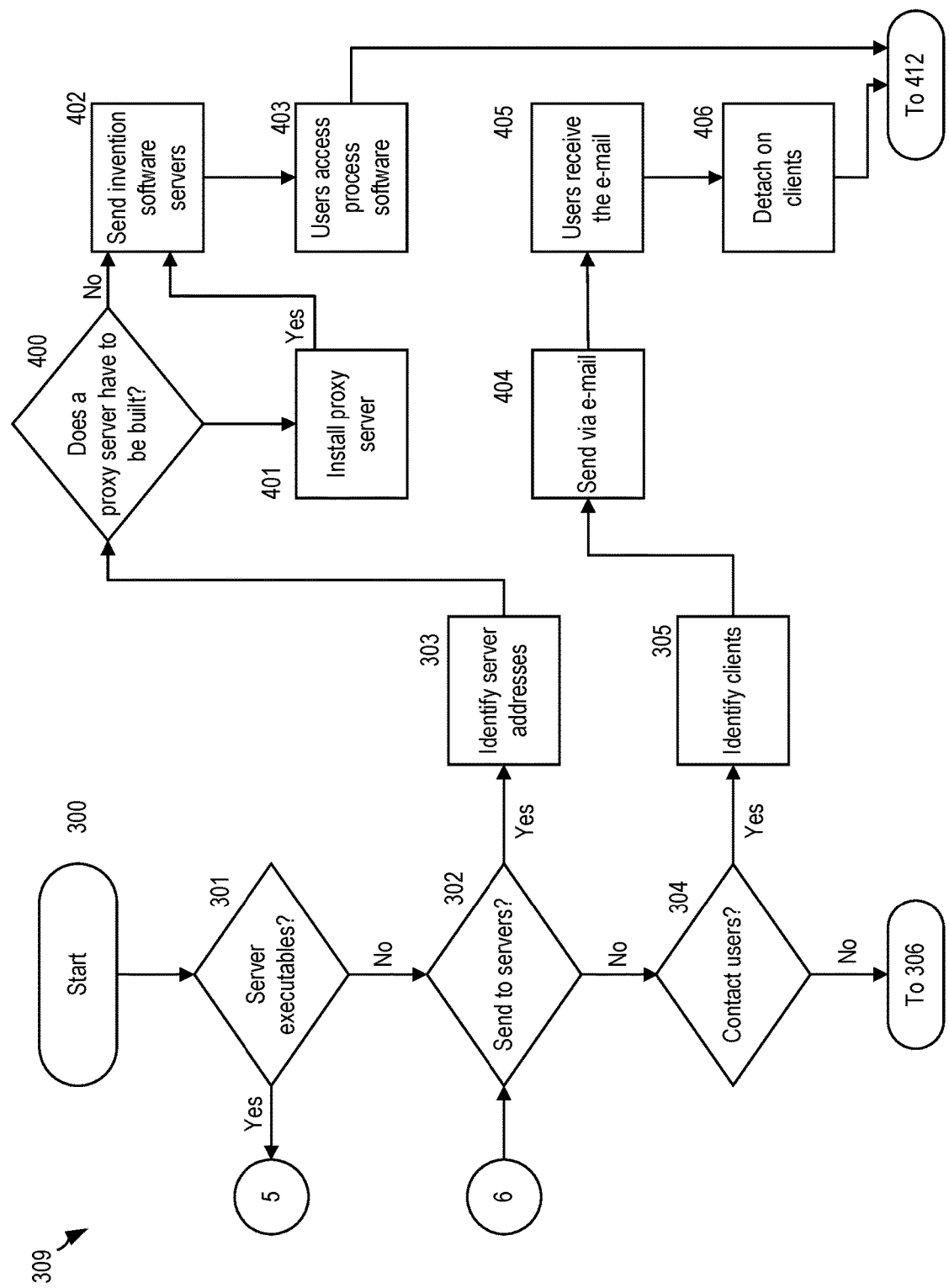
FIG. 3 is a flowchart of a method, in accordance with one embodiment of the present invention.
Figure 3:
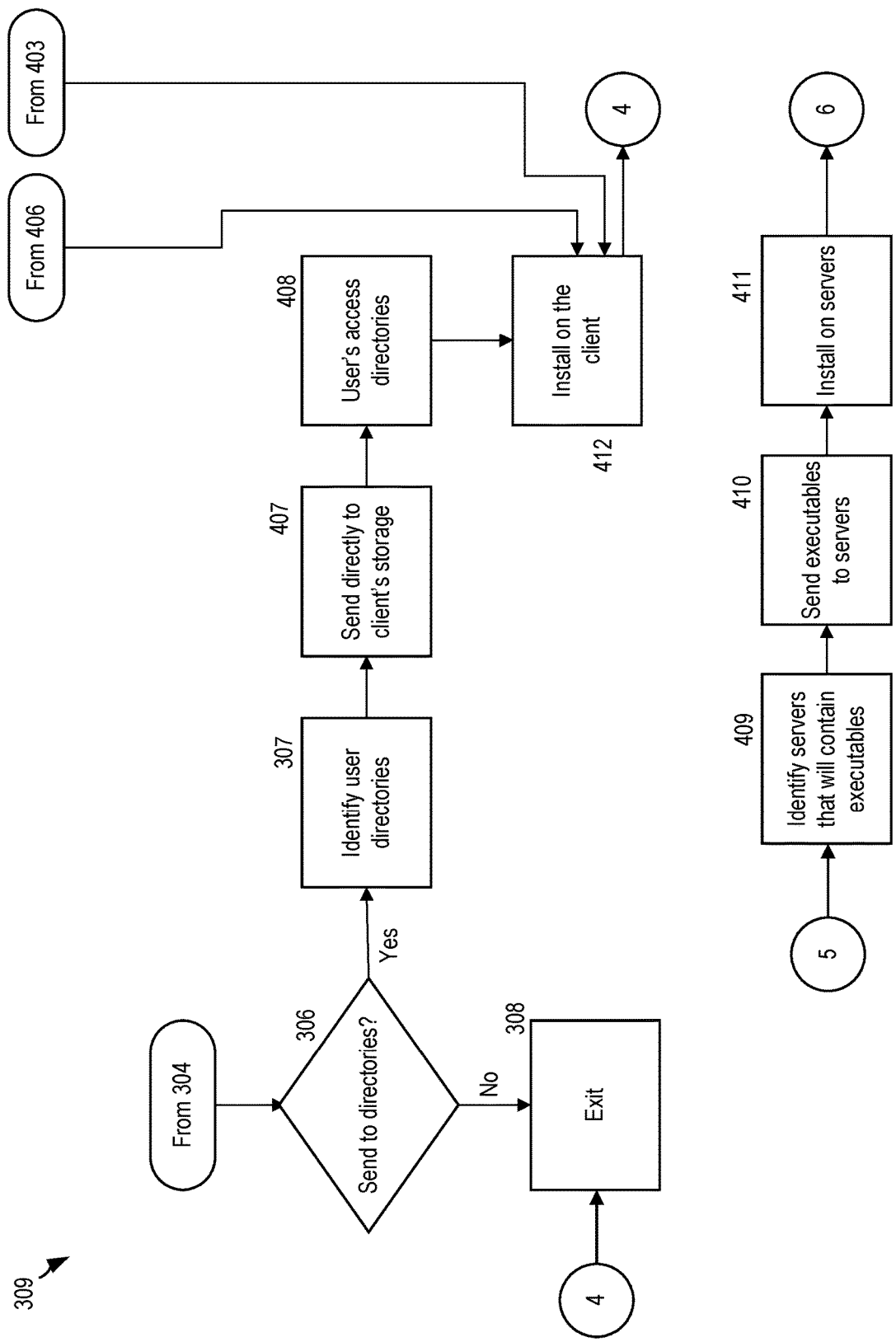

Now referring to FIG. 3, a flowchart of a method 309 is shown according to one embodiment. The method 309 may be performed in accordance with the present invention in any of the environments depicted in FIGS. 1-3, among others, in various embodiments. Of course, more or fewer operations than those specifically described in FIG. 3 may be included in method 309, as would be understood by one of skill in the art upon reading the present descriptions.

Each of the steps of the method 309 may be performed by any suitable component of the operating environment. For example, in various embodiments, the method 309 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 309. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software for selective failover between a plurality of devices concurrently running an application in order to prepare for and prevent predetermined interruption events from compromising use of the application may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 300 begins the deployment of the process software. An initial step is to determine if there are any programs that will reside on a server or servers when the process software is executed (301). If this is the case, then the servers that will contain the executables are identified (409). The process software for the server or servers is transferred directly to the servers' storage via FTP or some other protocol or by copying though the use of a shared file system (410). The process software is then installed on the servers (411).

Next, a determination is made on whether the process software is to be deployed by having users access the process software on a server or servers (302). If the users are to access the process software on servers, then the server addresses that will store the process software are identified (303).

A determination is made if a proxy server is to be built (400) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (401). The process software is sent to the (one or more) servers either via a protocol such as FTP, or it is copied directly from the source files to the server files via file sharing (402). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (403). Another embodiment is to have the servers automatically copy the process software to each client and then run the installation program for the process software at each client computer. The user executes the program that installs the process software on his client computer (412) and then exits the process (308).

In step 304 a determination is made whether the process software is to be deployed by sending the process software to users via e-mail. The set of users where the process software will be deployed are identified together with the addresses of the user client computers (305). The process software is sent via e-mail (404) to each of the users' client computers. The users then receive the e-mail (405) and then detach the process software from the e-mail to a directory on their client computers (406). The user executes the program that installs the process software on his client computer (412) and then exits the process (308).

Lastly, a determination is made on whether the process software will be sent directly to user directories on their client computers (306). If so, the user directories are identified (307). The process software is transferred directly to the user's client computer directory (407). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (408). The user executes the program that installs the process software on his client computer (412) and then exits the process (308).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    identifying a plurality of user devices determined to run a predetermined software version and a predetermined application;
    assigning a first of the identified user devices to be a primary user device;
    assigning a second of the identified user devices to be a first backup user device;
    in response to a determination that the first identified user device launches the predetermined application, causing the second identified user device to launch the predetermined application;
    in response to a determination that the first identified user device experiences a predetermined interruption event while using the predetermined application:
        assigning the second identified user device to be the primary user device, and
        assigning the first identified user device to be the first backup user device; and
    in response to a determination that the first identified user device recovers from the predetermined interruption event: assigning the first identified user device to be the primary user device.

2. The computer-implemented method of claim 1, comprising:
    in response to a determination that the second identified user device is not available for a scheduled use of the predetermined application by the first identified user device, causing a notification to be sent to the first identified user device,
    wherein the notification indicates that the second identified user device is not available.

3. The computer-implemented method of claim 2, comprising: in response to the determination that the second identified user device is not available for the scheduled use of the predetermined application by the first identified user device, causing the notification to be sent to a third of the identified user devices.

4. The computer-implemented method of claim 1, comprising:
    assigning a third of the identified user devices to be a second backup user device; and
    in response to the determination that the first identified user device launches the predetermined application, causing the third identified user device to launch the predetermined application.

5. The computer-implemented method of claim 4, comprising:
    in response to a determination that the second identified user device experiences a second predetermined interruption event while using the predetermined application and while the first identified user device is assigned as the first backup user device:
        assigning the third identified user device to be the primary user device, and
        assigning the second identified user device to be the second backup user device.

6. The computer-implemented method of claim 1, wherein the assignments are performed automatically, wherein the identified user devices are associated with the same user profile, wherein the identified user devices are determined to be available in response to a determination that the identified user devices are within a predetermined proximity of one another.

7. The computer-implemented method of claim 1, wherein the predetermined interruption event is selected from the group consisting of: a loss of network connection, a power outage, a restart, an audio failure, a software failure, and an update.

8. The computer-implemented method of claim 1, comprising: in response to the determination that the first identified user device recovers from the predetermined interruption event: assigning the second identified user device to be the first backup user device.

9. The computer-implemented method of claim 1, comprising: in response to the first identified user device being assigned to be the primary user device, outputting data associated with the first identified user device's use of the predetermined application to an off-site user device, wherein data associated with the second identified user device's use of the predetermined application is not output to the off-site user device while the first identified user device is assigned to be the primary user device and the second identified user device is assigned to be the first backup user device; and outputting, to the off-site user device, a notification of a delay in response to the determination that the first identified user device experiences the predetermined interruption event.

10. A computer program product, the computer program product comprising a computer readable storage medium having program instructions embodied therewith, the program instructions readable and/or executable by a controller to cause the controller to:
identify a plurality of user devices determined to run a predetermined software version and a predetermined application;
assign a first of the identified user devices to be a primary user device;
assign a second of the identified user devices to be a first backup user device;
in response to a determination that the first identified user device launches the predetermined application, cause the second identified user device to launch the predetermined application;
in response to a determination that the first identified user device experiences a predetermined interruption event while using the predetermined application:
assign the second identified user device to be the primary user device, and assign the first identified user device to be the first backup user device; and
in response to a determination that the first identified user device recovers from the predetermined interruption event: assign the first identified user device to be the primary user device.

11. The computer program product of claim 10, the program instructions readable and/or executable by the controller to cause the controller to:
in response to a determination that the second identified user device is not available for a scheduled use of the predetermined application by the first identified user device, cause a notification to be sent to the first identified user device,
wherein the notification indicates that the second identified user device is not available.

12. The computer program product of claim 11, the program instructions readable and/or executable by the controller to cause the controller to: in response to the determination that the second identified user device is not available for the scheduled use of the predetermined application by the first identified user device, cause the notification to be sent to a third of the identified user devices.

13. The computer program product of claim 10, the program instructions readable and/or executable by the controller to cause the controller to:
assign a third of the identified user devices to be a second backup user device; and
in response to the determination that the first identified user device launches the predetermined application, cause the third identified user device to launch the predetermined application.

14. The computer program product of claim 13, the program instructions readable and/or executable by the controller to cause the controller to:
in response to a determination that the second identified user device experiences a second predetermined interruption event while using the predetermined application and while the first identified user device is assigned as the first backup user device:
assign the third identified user device to be the primary user device, and assign the second identified user device to be the second backup user device.

15. The computer program product of claim 10, wherein the assignments are performed automatically, wherein the identified user devices are associated with the same user profile, wherein the identified user devices are determined to be available in response to a determination that the identified user devices are within a predetermined proximity of one another.

16. The computer program product of claim 10, wherein the predetermined interruption event is selected from the group consisting of: a loss of network connection, a power outage, a restart, an audio failure, a software failure, and an update.

17. The computer program product of claim 10, the program instructions readable and/or executable by the controller to cause the controller to: in response to the determination that the first identified user device recovers from the predetermined interruption event: assign the second identified user device to be the first backup user device.

18. The computer program product of claim 10, the program instructions readable and/or executable by the controller to cause the controller to: in response to the first identified user device being assigned to be the primary user device, output data associated with the first identified user device's use of the predetermined application to an off-site user device, wherein data associated with the second identified user device's use of the predetermined application is not output to the off-site user device while the first identified user device is assigned to be the primary user device and the second identified user device is assigned to be the first backup user device; and output, to the off-site user device, a notification of a delay in response to the determination that the first identified user device experiences the predetermined interruption event.

19. A system, comprising:
a processor; and
logic integrated with the processor, executable by the processor, or integrated with and executable by the processor, the logic being configured to:
identify a plurality of user devices determined to run a predetermined software version and a predetermined application;
assign a first of the identified user devices to be a primary user device;
assign a second of the identified user devices to be a first backup user device;

in response to a determination that the first identified user device launches the predetermined application, cause the second identified user device to launch the predetermined application;

in response to a determination that the first identified user device experiences a predetermined interruption event while using the predetermined application:
assign the second identified user device to be the primary user device, and assign the first identified user device to be the first backup user device; and in response to a determination that the first identified user device recovers from the predetermined interruption event: assign the first identified user device to be the primary user device.

20. The system of claim 19, the logic being configured to:
in response to a determination that the second identified user device is not available for a scheduled use of the predetermined application by the first identified user device, cause a notification to be sent to the first identified user device,
wherein the notification indicates that the second identified user device is not available.

* * * * *